Figure 10:
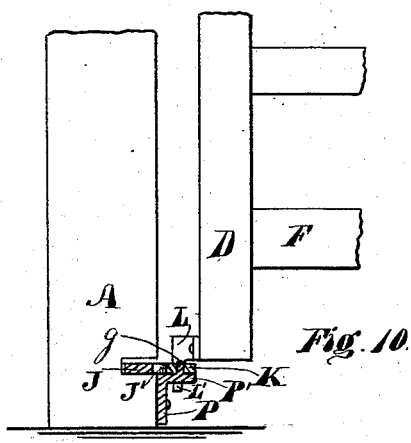

2 Sheets—Sheet 1.
M. T. & A. B. REEVES.
Apparatus for Opening and Closing Gates.
No. 217,484. Patented July 15, 1879.
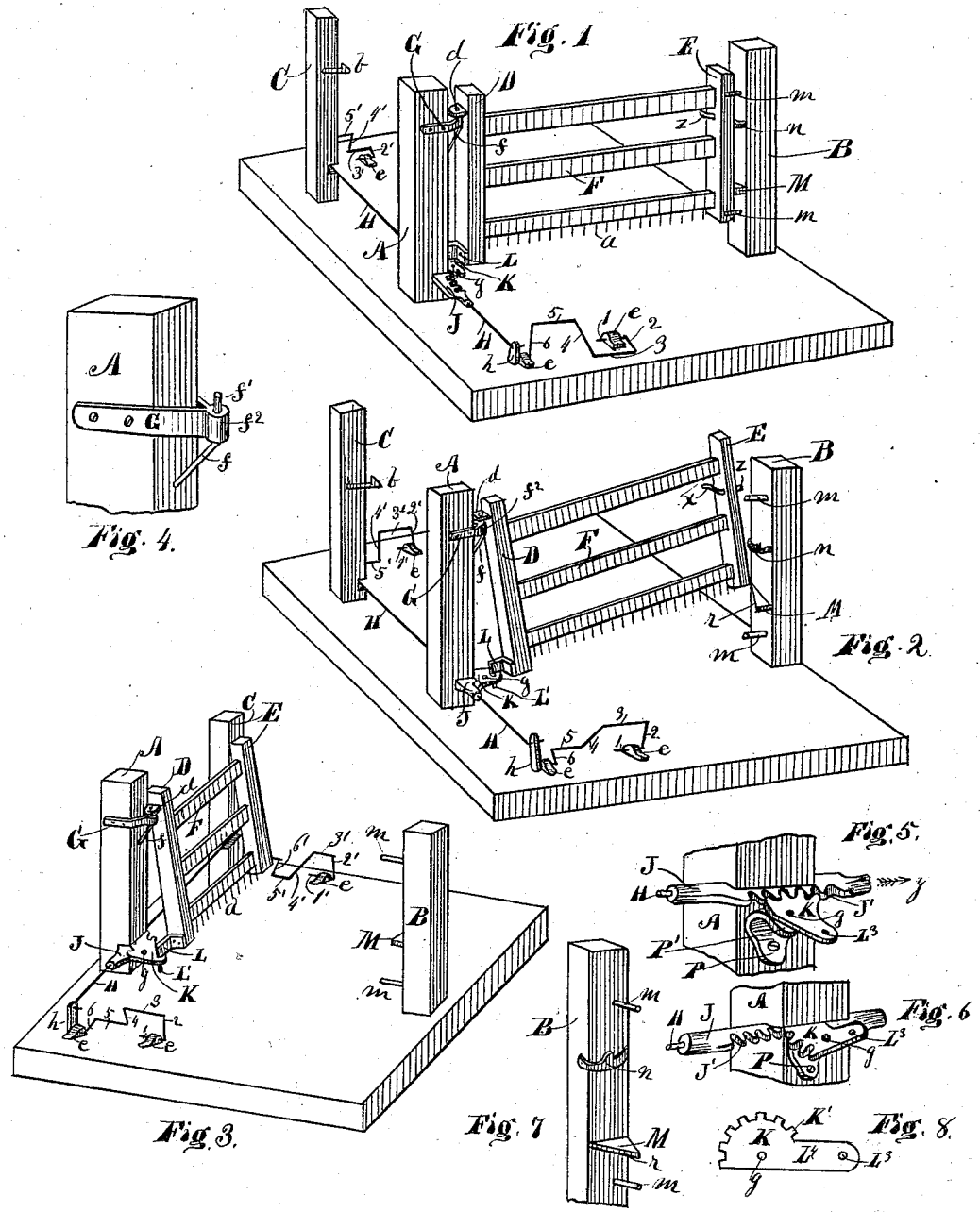
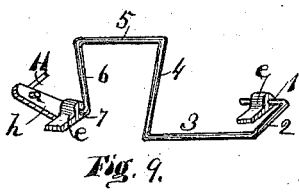
WITNESSES:
A. F. Spees
G. H. Rennett
INVENTOR'S
Marshal T. Reeves
Alfred B. Reeves
Per E. C. Frink
their Attorney 2 Sheets—Sheet 2.

M. T. & A. B. REEVES.
Apparatus for Opening and Closing Gates.

No. 217,484. Patented July 15, 1879.

WITNESSES:
D. F. Skees,
George Rennett.

INVENTORS,
Marshal T. Reeves
Alfred B. Reeves
Per E. D. Frink
their Atty

UNITED STATES PATENT OFFICE.

MARSHAL T. REEVES AND ALFRED B. REEVES, OF COLUMBUS, INDIANA.

IMPROVEMENT IN APPARATUS FOR OPENING AND CLOSING GATES.

Specification forming part of Letters Patent No. 217,484, dated July 15, 1879; application filed February 24, 1879.

*To all whom it may concern:*

Be it known that we, MARSHAL T. REEVES and ALFRED B. REEVES, of Columbus, in the county of Bartholomew and State of Indiana, have invented a new and useful Improvement in Apparatus for Opening and Closing Gates, of which the following is a description, reference being had to the accompanying drawings.

The object of our invention is to provide a system of newly constructed and arranged devices having new modes of operation, whereby a gate is made to open or shut automatically from either side.

Our invention consists in the new construction and arrangement of parts, and in the new combination of elements which are deemed essential in our newly-organized gate-operating device, as will be hereinafter fully described and set forth.

In the accompanying drawings, in which like letters of reference in the different figures indicate like parts, Figure 1 represents a perspective view of our newly-constructed apparatus, showing the gate closed. Fig. 2 represents the same with the gate elevated at its front end and inclined so as to swing open. Fig. 3 is a perspective view of the gate and operating devices when open. Fig. 4 represents a perspective view of the gate-post and upper hinge-bracket for supporting the gate. Fig. 5 is a perspective view of the cog-rack, the segment cog-arm forming part of the lower hinge-joint, and the bracket for supporting said arm, showing their relative positions when the gate is elevated at its front end and inclined so as to swing open; and Fig. 6 represents a perspective view of the same when the gate is closed. Fig. 7 is a perspective view of the post against which the gate closes, showing the arrangement of stops and the inclined device for starting the gate open as said gate is raised at its front end. Fig. 8 represents a plan view of the segment-arm that forms part of the lower hinge. Fig. 9 is a perspective of the trip or double cranks that operate the gate when said gate is opened or closed, and Fig. 10 represents an enlarged vertical section through the cog-rack and segment.

The trips or double cranks, Fig. 9, that are arranged in the roadway at each side of the gate, and which operate the throw-rod H T, are of peculiar construction, to wit: The rod forming each trip or crank is bent, with two opposite crank-arms, 3 and 5, for the wheels to strike against for the purpose of opening or closing the gate—that is, the crank, as shown in Fig. 9, is provided with a bent end, 1, that forms a journal that operates in the box *e*. The part 2 extends a short distance from said journal at a right angle, and is then bent parallel with the journal 1, as shown at 3, forming a bearing of sufficient length for the wheels of a vehicle to strike against. The rod is further bent at 4 parallel with the part 2, but inclined at an angle of about forty-five degrees, and is then bent, as at 5, parallel with the part 3, and then bent at 6, and provided with another long journal, 7, that operates in the box *e'*, thus forming a double trip for operating the throw-rod H J; and the inclined part 4 makes the trip strong and prevents the cranks 3 5 from being bent out of shape, and forms a brace to the elevated cranks, should they be accidentally struck, the part 3 lying parallel with the ground, while the part 5 is in a vertical position, and while in this position the part 4 is at an angle of about forty-five degrees, as shown in Figs. 9 and 1.

The journal 7 of the trip is provided with a crank, *h*, to which one end of the throw-rod H is pivoted. The throw-rod H extends from said crank *h*, which is located at any desired distance from the gate, to another crank, *h*, (not shown,) attached to the other trip, located at any required distance from the gate on the opposite side.

The throw-rod H is provided with a cog-rack, J, that operates in a slide-guide formed in the post, or attached thereto, so as to reciprocate back and forward in said guide and support the rod.

The end D of the gate, that is hinged to the post A, is provided at the top with an eyebolt, *d*, and the post A is provided with a bracket-hook, G *f*, in any ordinary manner.

The lower end of the gate-post D is provided with an angular corner-plate, L, having a projecting end, and further provided with a pin, L¹, as shown. Said pin L¹ operates in the hole L³ of the arm L⁴ of the segment cog-rack K. This segment cog-rack is of peculiar construction, to wit, Fig. 8: The cogs K' extending around its periphery about one-third of the circumference, (provided it makes a full wheel,) the pivot-hole $g$ is located in the center, and the arm $L^4$ projects in a quartering direction from the cogs, as shown in Fig. 8. The arm $L^4$ is also provided with a hole, $L^3$, in which the pin $L^1$ on the angular hinge-plate L operates, as shown.

The segment-rack K is mounted on a suitable bracket, P P', that may be attached to the post A, or to some other suitable support.

The teeth K' of the segment-rack K operate in the sliding rack J, and form a means of throwing the end post, D, of the gate out of balance, and raise the front post, E, thereby causing the gate to open when the rack J is moved in the direction of the arrow $y$, and to close when said rack is moved in the opposite direction, as shown in Figs. 1, 2, 3, 5, and 6. The lower rail of the gate is provided with a row of spikes, $a$, to prevent animals from raising the gate.

The post B, against which the gate closes, is provided with stop-pins, cleats, or brackets $m$ $m$ for the gate to shut against, and further provided with an ordinary catch, $n$, for holding the latch Z when the gate is shut. The post B is further provided with a bracket, M, that is attached to the post horizontally. Said bracket is provided with an angular face, $r$, against which the end E' of the gate-post E strikes as it is elevated by the action of the trips and their connecting mechanism, the sudden contact of the gate with the inclined bracket $r$ M forcing the gate to start open with a quick motion. As the gate opens to its widest point, the latch Z engages with the catch $b$ on the post C and holds the gate open, as shown in Fig. 3, until the front end of the gate is raised by turning down either the crank 3 or crank 3', Fig. 3.

The throw-rod H may be supported on upright posts, thus preventing the rod from swagging and binding, and said throw-rod may also be protected by a guard-board. (Not shown.)

The operation of our improved automatic gate is as follows, to wit: The gate, first being closed, is opened by the wheels of a vehicle striking the crank 5 or 5', Figs. 1, 2, and 3, at either side of the gate, and closed by striking the crank 3 or 3', also at either side of the gate. When the crank 5 or 5' is forced down by the wheels, the crank $h$ moves the throw-rods H and J, thus causing the rack J to partially rotate the segment-rack K, which throws the lower end of the gate-post D out from the post A, and also to one side, thus causing the front end, E, of the gate to be suddenly elevated and tilted slightly sidewise, thus releasing the latch Z from the catch $n$, and the end E' of the gate, at the same time striking the beveled side $r$ of the bracket M, is suddenly thrown or given a start in the direction that the gate is to open. The gate then, by its own gravity, aided by the bracket M, swings around, and the latch Z catches in the catch $b$, and the gate is held open with an inclined position, as in Fig. 3, until the wheels strike the crank 3 or 3'. Then the lower end of the gate-post D is moved back toward the post A, and at the same time is moved sidewise—that is, endwise of the gate—thus elevating the front end of the gate, and at the same time straightening up the side inclination of the gate and releasing the latch Z from the catch $b$, and the gate is permitted to swing shut by its own gravity.

The gate can be used and operated by foot-passengers by simply raising the latch Z and swinging the gate open in the usual manner. When the front end of the gate is raised and the gate tilted, as in Fig. 2, the relative position of the lower end of the gate-post D, segment-rack K, and rack-rod J prevents the gate from dropping until the position of the segment-rack K is reversed, as in Fig. 6.

What we claim as new, and desire to secure by Letters Patent, is—

1. The segment cog-rack K, having an arm, $L^4$, forming part of the hinge-joint, and pivoted to the bracket P P', in the manner and for the purpose specified.

2. The segment cog-rack K, having an arm, $L^4$, forming part of the hinge-joint, and pivoted to the bracket P P', combined with the rack-rod J H and trip-cranks, as and for the purpose specified.

3. The segment cog-rack K, having an arm, $L^4$, forming part of the hinge-joint, and pivoted to the bracket P P', combined with the rack-rod J H, the gate D, and hinge G $d$, as and for the purpose specified.

4. In combination with the gate D E, operated to be raised at its front end, and swung out of a perpendicular line at its rear end by the segment cog-rack K, bracket P P', and rack-rod J H, the angular-faced bracket M $r$ on post B, as and for the purpose specified.

In testimony whereof we have signed our names to this specification in the presence of two subscribing witnesses.

MARSHAL T. REEVES.
ALFRED B. REEVES.

Witnesses:
FRANK O'BRIEN,
L. H. HOBBS.